Feb. 11, 1930.   P. L. SCOTT   1,746,367
VALVE
Filed Feb. 18, 1924
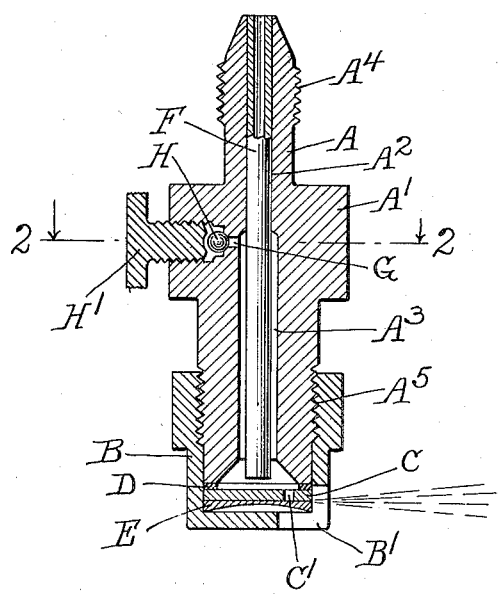
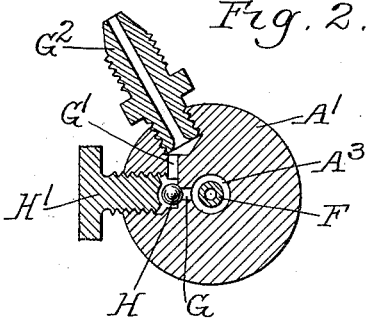
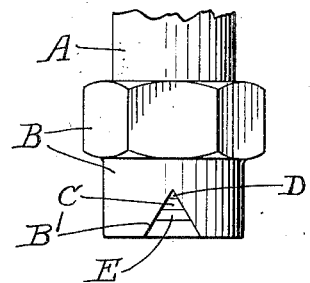
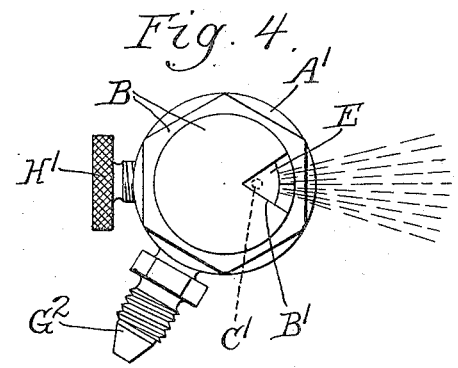
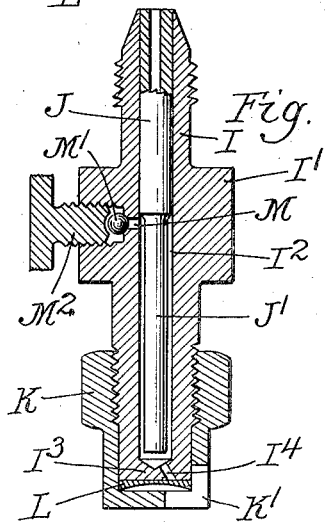
Inventor.
Philip L. Scott.
by Parker & Carter,
Attorneys.

Patented Feb. 11, 1930

1,746,367

UNITED STATES PATENT OFFICE

PHILIP LANE SCOTT, OF CHICAGO, ILLINOIS, ASSIGNOR TO SUPER-DIESEL TRACTOR CORPORATION, OF LA PORTE, INDIANA, A CORPORATION OF NEW YORK

VALVE

Application filed February 18, 1924. Serial No. 693,452.

This invention relates to valves, and particularly to valves adapted to produce extremely fine atomization or pulverization of the material which is delivered through them.
In the form illustrated herewith the valve is particularly adapted for use with internal combustion engines in which liquid fuel is forced at very great pressures and at very high velocities through an exceedingly small valve opening. The valve, however, is adapted generally to many other uses, and the form herewith is merely chosen as being typical of one important class of uses for which the valve is adapted.
One object of the invention is to provide a valve which will permit of exceedingly small openings even at very great pressures and which will be adapted to resist to the greatest possible extent the wear incident to great pressures and high velocities. Another object is to provide a valve in which the need of adjustment is greatly reduced. Another object is to provide a valve in which the spray so far as to characteristics may be controlled. Other objects will appear from time to time throughout the specification and claims.

My invention is illustrated more or less diagrammatically in the accompanying drawings, wherein—

Figure 1 is a vertical cross section through one form of the valve;

Figure 2 is a transverse cross section taken on line 2—2 of Figure 1;

Figure 3 is a side elevation of a portion of the discharge end of the valve;

Figure 4 is an end view of the discharge end of the valve;

Figure 5 is a vertical cross section similar to Figure 1 showing one modification of the valve.

Like parts are designated by like characters throughout.

A is the valve body. It is provided with an enlarged portion $A^1$ and a central bore $A^2$. In the form shown in Figure 1 the bore is enlarged as at $A^3$. The upper end of the valve body is threaded as at $A^4$ in order to permit the ready attachment of a supply line. The valve body A is threaded adjacent its lower end as at $A^5$. Secured to the lower end of the valve is the disc retaining cap B. This cap is cut away at $B^1$ and as shown the cut is preferably triangular in the vertical and the horizontal planes.

Within the retaining cap B and held against the valve body by means of it is a rigid and unyielding disc C. This disc is provided with one or more perforations or openings $C^1$. Between it and the valve body may be inserted a gasket D. Below the disc C and held against its lower face is a flexible disc E.

Located within the central bore $A^2$ of the valve body is a tube F. This tube extends preferably to a point close to the disc, that is close to the discharge end of the valve, and through the tube F liquid is conducted to the end of the valve.

Leading from the enlarged portion $A^3$ of the perforation in the valve body is a discharge passage G. This passage communicates with a second passage $G^1$ which opens into a by-pass discharge connection $G^2$ to which any suitable form of pipe or other connection may be attached. The opening from the passage $G^1$ to the passage G is normally closed by a ball H which is adapted to be seated by a controlling screw $H^1$.

In the form shown in Figure 5 the general arrangement is similar to that shown in the previous figures, but one of the discs is eliminated. The valve body I is provided with the enlargement $I^1$ and the bore $I^2$. The discharge end of the valve body is substantially closed by the end portion $I^3$. This portion is provided with one or more perforations or openings $I^4$. Located within the bore $I^2$ is a tube J which is of reduced size through a portion of its length as at $J^1$.

Secured to the discharge end of the valve body I is the retaining cap K which is provided with the opening $K^1$. Secured to the discharge end of the valve body by means of the cap K is a flexible disc L which is held closely against the outside end of the valve body.

In Figure 5 the by-pass discharge passage M is provided, which is normally sealed by a ball $M^1$ held in place by an adjusting screw $M^2$. The final by-pass discharge connection from the passage M is similar to that shown in the other form of the valve in Figures 1 and 2 and is not illustrated again in connection with the form shown in Figure 5.

Although I have shown an operative device, still it will be obvious that many changes in size, shape and arrangement of parts might be made without departing from the spirit of my invention; and I therefore wish that my showing be taken as in a sense diagrammatic. In particular the number and shape of openings from the discharge end of the valve to the flexible disc might be almost infinitely varied.

Where in the specification and claims I have used the expression "limitedly flexible" I mean that the degree of flexibility of the flexible member is extremely small. For example, in the form of the invention shown in Figure 1 the yielding member or the disc E is so slightly flexible that when it yields it will, under normal circumstances, produce an opening of only microscopic dimensions. This is not to be confused with valves well known in the prior art in which yielding members of light section or extremely flexible material are used and in which a very wide latitude of yielding is permitted.

The use and operation of my invention are as follows:

In the form shown the valve is assembled as illustrated and is then inserted into the combustion chamber of an internal combustion engine. The upper end of the valve is connected with a supply line from which liquid fuel is pumped preferably under very great pressure. The by-pass passage is normally closed. When the pressure within the valve body becomes sufficient, the fuel which has passed down toward the discharge end and through the perforation in the discharge end as shown in Figure 5 in the inner disc as shown in Figure 1, the outer flexible disc is deflected to a very slight degree. This opens the extremely small passage along the upper surface of the flexible disc and material is sprayed or atomized through this small passage in an extremely finely divided form. When the pressure is reduced, the flexible part springs back into place and the opening is closed and no further discharge takes place. Thus the valve opens and permits discharge in response to variations in pressure of the liquid which is supplied to the valve.

As is well recognized there is frequently accumulated in the fuel supply systems of internal combustion engines entrained air and gas, and it is therefore necessary to provide means for getting such air and gases away from the discharge end of the valve.

In the valve illustrated herewith, when it is desired to clear the valve and the supply system leading to it of entrained air and gas, the by-pass regulating screw is withdrawn and fuel is forced through the valve. The first pressure of fuel, of course, serves to unseat the ball and thereafter pressure cannot rise high enough in the valve to open it. The fuel thus comes into the valve, moves down through the supply tube to a point adjacent the discharge opening and because the valve is not open it sweeps back up about the outside of the by-pass tube and through the by-pass opening. Thus by reason of the construction shown it is possible completely to sweep the interior of the valve and so to clear it of entrained air and gases. When this operation has been carried out the by-pass opening is closed.

I claim:

1. In a valve a discharge controlling means including in combination a flexible imperforate member and a rigid part, the flexible member being held against said rigid part, means for introducing fluid between the flexible member and the rigid part, said flexible member being mounted to yield outwardly under the influence of fluid pressure from within the valve to permit discharge past its edge to the exterior, the amount of outward yielding of the flexible member being confined within narrow limits.

2. In a valve a discharge controlling means including in combination a yielding imperforate member and a rigid part, the yielding member being held against said rigid part, means for introducing fluid between the yielding member and the rigid part, said yielding member being mounted to yield outwardly under the influence of fluid pressure from within the valve to permit discharge past its edge to the exterior, the amount of outward yielding of the flexible member being confined within narrow limits.

3. In a valve a discharge controlling means including in combination a flexible imperforate member and a rigid part, the flexible member being held against said rigid part, there being between the two an extended area of contact, the contacting faces of the two conforming to each other, means for introducing fluid between the flexible member and the rigid part, said flexible member being mounted to yield under the influence of fluid pressure from within the valve to permit discharge past its edge to the exterior.

4. In a valve, a hollow body and a discharge controlling means including in combination a flexible member and a rigid part, the flexible member being held against said rigid part, means for introducing fluid, from the interior of the valve body, between the flexible member and the rigid part, said flexible member being held against movement along the major portion of its periphery and free for movement along a relatively limited portion of its periphery and along the latter portion adapted to yield under the influence of pressure of the fluid from within the valve body to permit discharge past its edge.

5. A valve comprising a hollow valve body having a discharge opening, a rigid member closing said opening and a flexible member in contact with said rigid member and means for holding said flexible member thereagainst, said flexible member supported and held against movement throughout most of its periphery and unsupported and free to move throughout the remaining portion of its periphery, and means for conveying liquid under pressure from the interior of said valve past said rigid closing member to the inner face of said flexible member whereby the pressure of the liquid within the valve may be exerted against said flexible member to flex the free portion of the same to permit discharge from the valve.

6. In a valve, a hollow valve body, a discharge opening therefrom, a partition at said discharge opening, and a flexible member held against said partition, means for conveying fluid under pressure past said partition to the inner face of said flexible member, said member adapted normally to prevent discharge from said valve and adapted to yield outwardly under pressure of said liquid from within to permit discharge from the valve past its edge, said flexible member held against movement throughout a portion only of its periphery being held in contact with said partition throughout an extended area of the major portion of the surface area of the two.

7. A valve comprising a body having a cavity within it, a rigid perforated disc closing the discharge end of said valve, a flexible imperforate disc outside said rigid disc and means for holding it thereagainst, comprising a retaining cap, a portion of said retaining cap being cut away immediately adjacent said imperforate disc and providing thereby the discharge communication from the flexible disc to the exterior.

8. A valve comprising a hollow body and having a rigid perforated part across its discharge end a flexible part being held against said discharge part and adapted normally to close the discharge opening and adapted to yield under fluid pressure from within the valve to permit discharge from the valve, said flexible member being held against movement throughout most of its periphery and free to move through the remainder of its periphery, whereby the size of the discharge orifice is limited.

9. In a valve a discharge controlling means including in combination a yielding imperforate member and a rigid part, the yielding member being held against said rigid part, means for introducing fluid from the valve between the yielding member and the rigid part, said yielding member adapted to yield under the influence of fluid pressure from within the valve to permit discharge, and being held in liquid tight contact with said rigid member, except in the direction in which discharge is to take place.

10. In a valve a discharge controlling means including in combination a flexible imperforate member and a rigid part, the flexible member being held against said rigid part, there being between the two an extended area of contact, the contacting faces of the two conforming to each other, means for introducing fluid from the valve between the flexible member and the rigid part, said flexible member adapted to yield under the influence of fluid pressure from within the valve to permit discharge, and being held in liquid tight contact with said rigid member, except in the direction in which discharge is to take place.

Signed at Chicago, county of Cook, and State of Illinois, this 15th day of February, 1924.

PHILIP LANE SCOTT.